US009055027B2

(12) United States Patent
Mao et al.

(10) Patent No.: US 9,055,027 B2
(45) Date of Patent: Jun. 9, 2015

(54) TRANSMISSION METHOD AND ELECTRONIC DEVICE

(71) Applicants: Lenovo (Beijing) Co., Ltd., Beijing (CN); Beijing Lenovo Software Ltd., Beijing (CN)

(72) Inventors: Xingzhong Mao, Beijing (CN); Wei Xie, Beijing (CN)

(73) Assignees: LENOVO (BEIJING) CO., LTD., Beijing (CN); BEIJING LENOVO SOFTWARE LTD., Beijing (CN)

( * ) Notice: Subject to any disclaimer, the term of this patent is extended or adjusted under 35 U.S.C. 154(b) by 152 days.

(21) Appl. No.: 13/763,774

(22) Filed: Feb. 11, 2013

(65) Prior Publication Data
US 2013/0212216 A1 Aug. 15, 2013

(30) Foreign Application Priority Data
Feb. 13, 2012 (CN) .......................... 2012 1 0031841

(51) Int. Cl.
G06F 13/00 (2006.01)
H04L 29/08 (2006.01)
H04N 19/139 (2014.01)
H04N 19/103 (2014.01)
H04N 19/167 (2014.01)

(52) U.S. Cl.
CPC .............. *H04L 67/02* (2013.01); *H04N 19/139* (2014.11); *H04N 19/103* (2014.11); *H04N 19/167* (2014.11)

(58) Field of Classification Search
CPC .. G06T 1/00; G06T 2207/20021; G06K 9/36; G06K 9/00221; G06K 9/00248; G09G 2340/02; G09G 2340/0407; G09G 2320/103; H04L 67/02; H04N 19/139; H04N 19/103; H04N 19/167
USPC ......... 709/246, 247, 236, 204–206, 217–219; 382/232, 235, 243
See application file for complete search history.

(56) References Cited

U.S. PATENT DOCUMENTS

| 8,265,136 B2 * | 9/2012 | Hong et al. ................... 375/240 |
| 8,681,860 B2 * | 3/2014 | Tsubaki ................... 375/240.12 |
| 2007/0233758 A1 * | 10/2007 | Moss ........................... 708/200 |
| 2008/0198934 A1 * | 8/2008 | Hong et al. ............. 375/240.22 |
| 2008/0267284 A1 * | 10/2008 | Tsubaki ................... 375/240.01 |
| 2009/0027337 A1 * | 1/2009 | Hildreth ........................ 345/158 |
| 2011/0222832 A1 * | 9/2011 | Aizawa ........................ 386/200 |
| 2013/0067524 A1 * | 3/2013 | Andrews et al. ............. 725/109 |
| 2013/0235935 A1 * | 9/2013 | Kang et al. ............... 375/240.16 |
| 2014/0177957 A1 * | 6/2014 | Clark ........................... 382/166 |

* cited by examiner

*Primary Examiner* — Kenneth R Coulter
(74) *Attorney, Agent, or Firm* — Brinks Gilson & Lione; G. Peter Nichols

(57) ABSTRACT

The present disclosure provides a transmission method and an electronic device. The transmission method includes the steps of detecting whether a predetermined condition is satisfied; dividing the data to be transmitted into a first data and a second data when determining that the predetermined condition has been satisfied; converting the first data to a third data with a first algorithm and the second data to a fourth data with a second algorithm, so that the sum of the amounts of the third data and the fourth data is less than the sum of the amounts of the first data and the second data, wherein the first algorithm is different from the second algorithm; and transmitting the third data and the fourth data to the receiving device.

19 Claims, 1 Drawing Sheet

TRANSMISSION METHOD AND ELECTRONIC DEVICE

This application claims priority to Chinese patent application No. CN 201210031841.X filed on Feb. 13, 2012, the entire contents of which is incorporated herein by reference.

BACKGROUND

This invention relates to a transmission method and an electronic device.

The applications such as video conference and video chatting and the like have been widely used in the electronic devices such as PC, notebook PC etc. Further, the functions such as video chatting etc. will be certainly more popular in the electronic products with the increasing enhancements of the computing performance of CPU and the performance of the audio-visual codec in the mobile interconnecting products (e.g. a smart phone, a tablet computer etc). However, the problem concerning data transmission occurs during the development of the applications.

In particular, the wireless bandwidth source available to the user is limited while the amount of dataflow to be transmitted becomes more and more. Taking an image or video data as an example, the number of the pixels in a camera head of a mobile phone becomes larger and larger, and in the popular configuration, there are 30-100 thousand pixels in a front camera head and 5-8 million pixels in a back camera head. Moreover, the more the pixels are, the larger the compressed image or video data is. Besides, it needs to transmit other data such as voice data between the electronic devices. Therefore, the increasing speed of the bandwidth for wireless transmission is not able to catch up the increasing speed of the data to be transmitted. Furthermore, the wireless bandwidth available in practice would be very limited as the more and more electronic devices serve as the user devices in a network.

In addition, since a number of electronic devices serve as mobile devices, when such electronic devices are in motion, the amount of the dataflow to be transmitted might increase abruptly; for an instance, the amount of the video data increases greatly in the case of interframe compression. When the amount of data to be transmitted is greater than the wireless bandwidth source, the problems such as congestion of data, loss of data packets and the like might occur. Thus, the quality issue of the data transmission such as video sluggishness, mosaic may present at the receiving device end, thus affecting the perception of the users.

Therefore, a transmission method is desired to improve the quality of the data transmission.

SUMMARY

Thus, the present invention is made to address the issues and requirements existing in the prior art.

A purpose of an embodiment of the present is to provide a transmission method and an electronic device which can reduce the amount of the data to be transmitted by processing individual parts of the data to be transmitted separately, thus improving the quality of the data transmission.

According to an aspect of the embodiment of the present invention, a transmission method is provided, which is applied to a sending device in a transmission network, and used for transmitting data to a receiving device from the sending device over the transmission network, wherein the transmission method comprises the steps of: detecting whether a predetermined condition is satisfied; dividing the data to be transmitted into a first data and a second data when determining that the predetermined condition has been satisfied; converting the first data to a third data with a first algorithm and the second data to a fourth data with a second algorithm, so that the sum of the amounts of the third data and the fourth data is less than the sum of the amounts of the first data and the second data, wherein the first algorithm is different from the second algorithm; and transmitting the third data and the fourth data to the receiving device.

In the above transmission method, the step for detecting whether the pre-determined condition is satisfied is specifically embodied as below: detecting whether the network transmission flow over the transmission network is greater than a first threshold.

In the transmission method as described above, the step for detecting whether the pre-determined condition is satisfied is specifically embodied as below: detecting whether the network transmission quality over the transmission network is less than a second threshold.

In the above transmission method, the step for detecting whether the pre-determined condition is satisfied is specifically embodied as below: detecting whether the sending device transmits the data to be transmitted in an interframe compression manner; in the case of detecting that the sending device transmits the data to be sent in an interframe compression manner, detecting by a sensor whether a motion parameter of the sending device is greater than a third threshold.

In the above transmission method, the step for detecting whether the pre-determined condition is satisfied is specifically embodied as below: when the sending device transmits the data to be sent in an interframe compression manner, detecting by a sensor whether a motion parameter of the sending device is greater than a third threshold.

In the above transmission method, the motion parameter is at least one of the parameters of the sending device as follows: motion speed, motion amplitude, and motion angle.

In the above transmission method, the step of converting the first data into the third data by the first algorithm and converting the second data into the fourth data by the second algorithm is specifically embodied as below: compressing the first data into the third data by a first compression algorithm; compressing the second data into the fourth data by a second compression algorithm; wherein, the second compression algorithm has a higher data compression ratio than the first compression algorithm does.

In the above transmission method, the step of converting the first data into the third data by the first algorithm and converting the second data into the fourth data by the second algorithm is specifically embodied as below: converting the first data into the third data to be transmitted at a first frame rate; converting the second data into the fourth data to be transmitted at a second frame rate; wherein, the first frame rate is greater than the second frame rate.

In the above transmission method, the data transmitted from the sending device to the receiving device over the transmission network are images.

In the above transmission method, the step for dividing the data to be transmitted into the first data and the second data is specifically embodied as below: dividing the image into an important area and a non-important area according to a pre-determined strategy, wherein, the image in the important area serves as the first data and the image in the non-important area serves as the second data; and the step for converting the first data into the third data by the first algorithm and converting the second data into the fourth data by the second algorithm is specifically embodied as below: compressing the important area of the image by a first compression algorithm; and compressing the non-important area of the image by a second compression algorithm, wherein the second compression algorithm has a higher data compression ratio than the first compression algorithm does.

In the above transmission method, the step for dividing the data to be transmitted into the first data and the second data is specifically embodied as below: dividing the image into an important area and a non-important area according to a pre-determined strategy, wherein, the image in the important area serves as the first data and the image in the non-important area serves as the second data; and the step for converting the first data into the third data by the first algorithm and converting the second data into the fourth data by the second algorithm is specifically embodied as below: transmitting the important area of the image at a first frame rate; and transmitting the non-important area of the image at a second frame rate, wherein the first frame rate is greater than the second frame rate.

In the above transmission method, the sending device includes an image collection unit, wherein prior to the step for detecting whether the pre-determined condition is satisfied, the method further comprises: collecting an image by the image collection unit as the data to be transmitted.

In the above transmission method, the step for collecting the image by the image collection unit of the sending device as the data to be transmitted is specifically embodied as below: collecting the image in real-time by the image collection unit of the sending device as the data to be transmitted.

In the above transmission method, the step for dividing the image into the important area and non-important area according to the pre-determined strategy is specifically embodied as below: using a fixed area in the image as the important area and the area other than the fixed area as the non-important area.

In the above transmission method, the step for dividing the image into the important area and non-important area according to the pre-determined strategy is specifically embodied as below: determining a pre-determined object into which the important area to be divided in the image; analyzing the image to identify the boundary of the pre-determined object; and dividing the image into the important area and non-important area with the boundary.

In the above transmission method, the step for determining the pre-determined object into which the important area to be divided in the image is specifically embodied as below: determining a face of human in the image as the pre-determined object.

According to another aspect of the embodiments of the present invention, an electronic device is provided, which serves as a sending device in a transmission network and transmits data from the electronic device to a receiving device over the transmission network, the electronic device comprising: a detecting module configured to detect whether a pre-determined condition is satisfied; a dividing module configured to divide the data to be transmitted into a first data and a second data when the detecting module detects that the pre-determined condition is satisfied; a converting module configured to convert the first data divided by the dividing module to a third data by a first algorithm and convert the second data divided by the dividing module to a fourth data by a second algorithm so that the sum of the amounts of the third data and the fourth data is less than the sum of the amounts of the first data and the second data, wherein the first algorithm is different from the second algorithm; and a transmitting module, transmitting the third data and the fourth data converted by the converting module to the receiving device.

In the above electronic device, in particular, the detecting module is used for detecting whether the network transmission flow of the transmission network is greater than a first threshold.

In the above electronic device, in particular, the detecting module is used for detecting whether the network transmission quality of the transmission network is less than a second threshold.

In the above electronic device, the detecting module comprises a sensor, and in particular the detecting module is used for detecting whether the sending device transmits the data to be transmitted in an interframe compression manner; and in the case of detecting that the sending device transmits the data to be transmitted in an interframe compression manner, detecting by the sensor whether a motion parameter of the sending device is greater than a third threshold.

In the above electronic device, the detecting module comprises a sensor, and in particular the detecting module is used for detecting by the sensor whether a motion parameter of the sending device is greater than a third threshold when the sending device transmits the data to be transmitted in an interframe compression manner, In the above electronic device, the motion parameter is at least one of the parameters of the sending device as follows: motion speed, motion amplitude, and motion angle.

In the above electronic device, particularly, the converting module is used for compressing the first data into the third data by a first compression algorithm and compressing the second data into the fourth data by a second compression algorithm; wherein, the second compression algorithm has a higher data compression ratio than the first compression algorithm does.

In the above electronic device, particularly, the converting module is used for converting the first data into the third data to be transmitted at a first frame rate and converting the second data into the fourth data to be transmitted at a second frame rate; wherein, the first frame rate is greater than the second frame rate.

In the above electronic device, the data transmitted from the sending device to the receiving device over the transmission network are images.

In the above electronic device, particularly, the dividing module is used for dividing the image into an important area and a non-important area according to a pre-determined strategy, wherein, the image in the important area serves as the first data and the image in the non-important area serves as the second data; and the converting module is particularly used for compressing the important area of the image by a first compression algorithm and compressing the non-important area of the image by a second compression algorithm, wherein the second compression algorithm has a higher data compression ratio than the first compression algorithm does.

In the above electronic device, particularly, the dividing module is used for dividing the image into an important area and a non-important area according to a pre-determined strategy, wherein, the image in the important area serves as the first data and the image in the non-important area serves as the second data; and the transmitting module is particularly used for transmitting the important area of the image at a first frame rate and transmitting the non-important area of the image at a second frame rate, wherein the first frame rate is greater than the second frame rate.

In the above electronic device, an image collection unit is further included therein, wherein an image collected by the image collection unit serves as the data to be transmitted.

In the above electronic device, the image collected in real-time by the image collection unit serves as the data to be transmitted.

In the above electronic device, dividing the image into the important area and non-important area according to the pre-determined strategy by the dividing module is specifically embodied as below: using a fixed area in the image as the important area and the area other than the fixed area as the non-important area.

In the above electronic device, dividing the image into the important area and non-important area according to the pre-determined strategy by the dividing module is specifically embodied as below: determining a pre-determined object into which the important area to be divided in the image; analyzing the image to identify the boundary of the pre-determined object; and dividing the image into the important area and non-important area with the boundary.

In the above electronic device, determining a pre-determined object into which the important area to be divided in the image by the dividing module is specifically embodied as below: determining a face of human in the image as the pre-determined object.

By means of the transmission method and the electronic device according to the embodiments of the present invention, the data to be transmitted can be divided into a plurality of parts, and individual parts can be processed separately to reduce the amount of the data to be transmitted, thus improving the quality of the data transmission.

BRIEF DESCRIPTION OF THE DRAWINGS

To make the embodiments of the present invention or the technical solutions in the prior art more clear, hereinafter, a simple introduction will be made to the attached drawings used in the descriptions of the embodiments or the prior art. Obviously, the drawings in the description only show some of the embodiments of the present invention, and for those skilled in the art, other drawings can be obtained in accordance with these drawings without paying any inventive labor.

DETAILED DESCRIPTION

Hereinafter, a transmission method and an electronic device according to the embodiments of the present invention are described in detail with reference to the attached drawings.

According to an aspect of an embodiment of the present invention, a transmission method is provided, which is applicable to a sending device in a transmission network, for transmitting data to a receiving device from the sending device over the transmission network, wherein the transmission method comprises the steps of: detecting whether a pre-determined condition is satisfied; dividing the data to be transmitted into a first data and a second data upon determining that the predetermined condition has been satisfied; converting the first data to a third data with a first algorithm and the second data to a fourth data with a second algorithm, so that the sum of the amounts of the third data and the fourth data is less than the sum of the amounts of the first data and the second data, wherein the first algorithm is different from the second algorithm; and transmitting the third data and the fourth data to the receiving device.

By means of the above transmission method according to the embodiment of the present invention, the data to be transmitted can be divided when detecting that a predetermined condition is satisfied, and a divided first data and a divided second data as divided are processed with different algorithms so that the sum of the amounts of the third data and the fourth data to be transmitted is less than the sum of the amounts of the first data and the second data prior to being processed. Thus, it can improve the quality of the data transmission over the transmission network, since the amount of the data to be transmitted via the transmission network is reduced.

Figure 1:
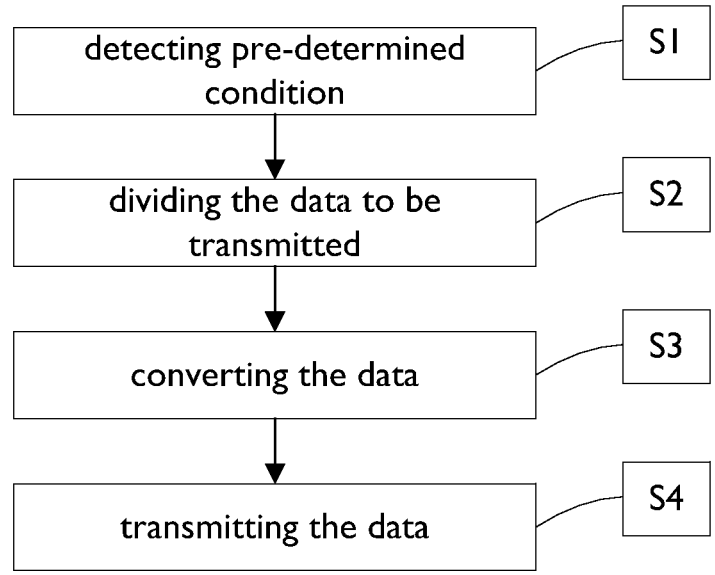
FIG. 1 is a schematic flowchart illustrating a transmission method according to an embodiment of the present invention.

FIG. 1 is a schematic flowchart illustrating the transmission method according to the embodiment of the present invention. The transmission method is applicable to a sending device in a transmission network, and is used for transmitting data to a receiving device from the sending device over the transmission network. As shown in FIG. 1, the transmission method comprises the steps of: S1, detecting whether a pre-determined condition is satisfied; S2, dividing the data to be transmitted into a first data and a second data upon determining that the predetermined condition has been satisfied; S3, converting the first data to a third data with a first algorithm and the second data to a fourth data with a second algorithm, so that the sum of the amounts of the third data and the fourth data is less than the sum of the amounts of the first data and the second data, wherein the first algorithm is different from the second algorithm; and S4, transmitting the third data and the fourth data to the receiving device.

Herein, it is appreciated for those skilled in the art that, in the examples as mentioned above and the embodiments in the following description, although the data to be transmitted is divided into a first data and a second data, and the first data and the second data are converted to a third data and a fourth data respectively, the embodiments of the present invention are not limited to the case in which the data to be transmitted are divided into two parts. Instead, in the transmission method according to the embodiments of the present invention, the data to be transmitted can be divided into three parts or more, and different algorithms can be applied to each of parts respectively for further processing, so that the sum of the amounts of the data after being processed is less than the sum of the amounts of the data before being processed. Further, the processes on the individual parts divided from the data to be transmitted are not necessarily different from each other totally, and it only needs that the processes on the individual parts are not identical each other in algorithm. For example, if the data to be transmitted is divided into a first data, a second data and a third data, then the above three parts can be processed with a first algorithm, a second algorithm, and a third algorithm respectively. As an alternation, the first data and the second data can be processed with a first algorithm, and the third data can be processed with a second algorithm. Herein, the embodiments of the present invention are not intended to make any limitation.

In the above transmission method, the step for detecting whether the pre-determined condition is satisfied is specifically embodied as below: detecting whether the network transmission flow over the transmission network is greater than a first threshold.

In the above transmission method, the step for detecting whether the pre-determined condition is satisfied is specifically embodied as below: detecting whether the network transmission quality over the transmission network is less than a second threshold.

As mentioned in the Background, in the transmission network for transmitting data, if the amount of the data to be transmitted is beyond the amount of the data which can be carried over the transmission network, the quality of the data transmitted from the sending device to the receiving device deteriorates. Therefore, in the transmission method according to the embodiments of the present invention, it can be determined whether the case in which the quality of the data transmitted deteriorates occurs or not by judging the network transmission flow or network transmission quality over the transmission network, and thus the quality of the transmitted data can be improved by dividing and individually processing the data to be transmitted. In particular, since each transmission network has an upper limit threshold for the network transmission flow, the quality of the transmitted data deteriorates when the amount of the data to be transmitted is beyond the threshold for the transmission flow. In addition, since the condition of the network is affected by a variety of factors, there might occur the case in which the ideal transmission flow can not be carried over the network due to the deterioration of the transmission quality of the network itself although the amount of the data to be transmitted is not beyond the threshold of the transmission flow. In such a case, the transmission method according to the embodiments of the present invention can detect the network transmission quality over the transmission network, and divide and process individually the data to be transmitted to improve the quality of the transmitted data in the case of the lowering of the network transmission quality. Moreover, it is appreciated for those skilled in the art that the criterion for judging the network transmission flow over the transmission network and that for judging the network transmission quality over the transmission network can be combined with each other.

Furthermore, the detections of the transmission flow and the transmission quality over the network can be performed dynamically during the data transmission, and can also be performed statically when the data are transmitted over different networks. That, when the data are intended to be transmitted over a certain network, the network bandwidth of the transmission network and/or the quality of the transmitted signal can be pre-detected, and then it is determined whether the transmission method according to the embodiments of the present invention is employed based on the detection result of the bandwidth of the network and/or the quality of the transmitted signal, thus improving the quality of the transmitted data by dividing and processing individually the data to be transmitted.

In the above transmission method, the step for detecting whether the pre-determined condition is satisfied is specifically embodied as below: detecting whether the sending device transmits the data to be transmitted in an interframe compression manner; in the case of detecting that the sending device transmits the data to be sent in an interframe compression manner, detecting by a sensor whether a motion parameter of the sending device is greater than a third threshold.

In the above transmission method, the step for detecting whether the pre-determined condition is satisfied is specifically embodied as below: when the sending device transmits the data to be sent in an interframe compression manner, detecting by a sensor whether a motion parameter of the sending device is greater than a third threshold.

In the above transmission method, the motion parameter is at least one of the parameters of the sending device as follows: motion speed, motion amplitude, and motion angle.

In the Background, it is mentioned that the data to be transmitted can be transmitted in an interframe compression manner; herein, the interframe compression refers to a technique which compresses the redundance between the adjacent frames to further improve the compression volume and reduce the compression ratio based on a large correlation between the successively two frames in a number of videos or animations or the characteristics of a slight information change between the successively two frames, i.e., based on the fact that there is redundancy information between the adjacent frames in a successive video. For instance, in the applications such as video conference, video chatting and the like, when an electronic device as the sending device maintains static basically, a large compression ratio of the data to be transmitted can be obtained in the interframe compression manner. Nevertheless, when the electronic device as the sending device begins to move, e.g., shifting, rotating at the original location, shaking etc., the compression ratio of the data compressed in the interframe compression manner is lowered, and thus the amount of the data to be transmitted after being compressed increases significantly. Moreover, the more dramatic the motion is, the larger the amount of the data to be transmitted is.

Therefore, in the transmission method according to the embodiments of the present invention, whether the sending device is in static state or in motion state is detected by a sensor to judge the amount of the data to be transmitted indirectly. In particular, it is firstly determined whether the sending device transmits the data to be transmitted in an interframe compression manner, and then it is detected whether a motion parameter of the sending device is greater than a pre-determined threshold, and thus it is judged whether the sending device is in a relatively dramatic motion state. In addition, for some sending devices, it might be possible that the data to be transmitted are transmitted only in an interframe compression manner. In such a case, it is not necessary to detect whether the sending device transmits the data to be transmitted in an interframe compression manner, and the current motion parameters of the sending device are detected directly. Herein, as mentioned above, the motion style of the sending device can comprise a variety of the motion manners such as shifting, rotating at the original location, and shaking, etc., and the corresponding motion parameters can also comprise a plurality of parameters such as motion speed, motion amplitude and motion angle, etc. Herein, the embodiments of the present invention are not intended to set any limits thereon.

In the above transmission method, the step of converting the first data into the third data by the first algorithm and converting the second data into the fourth data by the second algorithm is specifically embodied as below: compressing the first data into the third data by a first compression algorithm; compressing the second data into the fourth data by a second compression algorithm; wherein, the second compression algorithm has a higher data compression ratio than the first compression algorithm does.

As mentioned above, after dividing the data to be transmitted into a first data and a second data, different methods for processing data are employed to reduce the amount of the data to be transmitted. Compression of the data is an approach to reduce the amount of data, and in the transmission method according to the embodiments of the present invention, a first data and a second data are compressed by a first compression algorithm and a second compression algorithm respectively, so that the sum of the amounts of the third data and the fourth data is less than the sum of the amount of the first data and the second data. In addition, herein, the second compression algorithm has a higher data compression ratio than the first compression algorithm does.

In the above transmission method, the step of converting the first data into the third data by the first algorithm and converting the second data into the fourth data by the second algorithm is specifically embodied as below: converting the first data into the third data to be transmitted at a first frame rate; converting the second data into the fourth data to be transmitted at a second frame rate; wherein, the first frame rate is greater than the second frame rate.

Furthermore, in addition to processing the data to be transmitted by a data compression, the first data and the second data after being divided can be processed in other manners. As defined in the art of communication, a frame refers to a specific data structure consisting of several characters or fields as pre-determined according to certain criteria, comprising a head and the data of the frame. In the art of video, a frame often refers to a single image. In the transmission method of the embodiments of the present invention, based on the difference of the types of the data to be transmitted, different meanings can be used for the definition of the frame. Herein, after the data to be transmitted is divided into the first data and the second data, the third data and the fourth data are transmitted at the first frame rate and the second frame rate respectively, so that for the transmission dataflow over the transmission network, the sum of the amounts of the third data and the fourth data is less than that of the first data and the second data. In addition, the first frame rate is greater than the second frame rate; i.e., the two parts of data are transmitted at different frame rates.

In the above transmission method, a piece of the data transmitted from the sending device to the receiving device over the transmission network is an image.

In the application modes such as video chatting, video conference etc., the data transmitted over the transmission network is mainly an image, and there is possibly an audio accompanied. Besides, in the application mode such as telephone conference, the data transmitted over the transmission network only comprises audio. Moreover, it is appreciated for those skilled in the art that, in other application mode, the data transmitted from the sending device to the receiving device over the transmission network might be the data of other types. The embodiments of the present invention are not intended to set any limits thereon. Additionally, in the transmission method of the embodiments of the present invention, the data to be transmitted are divided into the first data and the second data of the same type, that is, the data to be transmitted are of the same type. Specifically, as in the application mode such as video chatting mentioned above, instead of the data to be transmitted being divided into the video data and the audio data to be processed respectively, the data to be transmitted are divided into a first data and a second data of the same type. Herein, both the first data and the second data can be of the data which combine the image with the audio.

In the above transmission method, the step for dividing the data to be transmitted into the first data and the second data is specifically embodied as below: dividing the image into an important area and a non-important area according to a pre-determined strategy, wherein, the image in the important area serves as the first data and the image in the non-important area serves as the second data; and the step for converting the first data into the third data by the first algorithm and converting the second data into the fourth data by the second algorithm is specifically embodied as below: compressing the important area of the image by a first compression algorithm; and compressing the non-important area of the image by a second compression algorithm, wherein the second compression algorithm has a higher data compression ratio than the first compression algorithm does.

Particularly, with regard to the image data, when the image data are divided so as to be processed separately, the image data can be divided into an important area and a non-important area to be processed differently. The image data in the important area is compressed by a first compression algorithm, wherein the algorithm can be an excellent algorithm for lossless compression to ensure the quality of the image, e.g., MPEG4, H.264 compression algorithm etc. For the non-important area, a second compression algorithm different from the first compression algorithm can be employed, wherein the second compression algorithm can be a lossless compression or a loss compression, while the compression ratio thereof is higher than that of the first compression algorithm, so that the amount of the compressed data is reduced to improve the transmission quality of the data.

Herein, the second compression algorithm can use a self-compression algorithm; as an alternation, the second data can be firstly processed in every other row, every other column, and then is compressed by a first compression algorithm. In addition, the second compression algorithm can ignore the least significant bit in the number of the row and the least significant bit in the number of the column when the compression is performed, that is, a AND operation is performed on the number of the row, the number of the column and 0xFFFE. Thus, the compression process on odd rows is actually the compression process on the data in the preceding even rows. Furthermore, since the data in two rows are identical, the compression ratio is increased accordingly.

In the above transmission method, the step for dividing the data to be transmitted into the first data and the second data is specifically embodied as below: dividing the image into an important area and a non-important area according to a pre-determined strategy, wherein, the image in the important area serves as the first data and the image in the non-important area serves as the second data; and the step for converting the first data into the third data by the first algorithm and converting the second data into the fourth data by the second algorithm is specifically embodied as below: transmitting the important area of the image at a first frame rate; and transmitting the non-important area of the image at a second frame rate, wherein the first frame rate is greater than the second frame rate.

Further, the same as the above-mentioned, in addition to the use of the different compression algorithms, the important area and the non-important area of the divided image can be transmitted respectively at different frame rates, so as to reduce the amount of the data to be transmitted. For example, when the important area of the image is transmitted at a first frame rate of 60 frames/s, the non-important area of the image can be transmitted at a second frame rate of 30 frames/s. Thus, the amount of dataflow of the second data to be transmitted is reduced in half, improving the quality of the data transmission over the network.

In the above transmission method, the sending device includes an image collection unit, wherein prior to the step for detecting whether the pre-determined condition is satisfied, the method further comprises the step: collecting an image by the image collection unit as the data to be transmitted.

In the above transmission method, the step for collecting the image by the image collection unit of the sending device as the data to be transmitted is specifically embodied as below: collecting the image in real-time by the image collection unit of the sending device as the data to be transmitted.

In the current electronic devices, e.g., portable devices such as mobile phones, portable computers and the like, an image collection unit such as a camera head is a commonly-used configuration. In the transmission method according to the embodiments of the present invention, especially in the scenario such as video conference, video chatting and the like, the data to be transmitted are the images collected by the image collection unit of the above electronic device. Moreover, such an image can be pre-collected by the image collection unit and then be transmitted, or can be collected and transmitted in real-time.

In the above transmission method, the step for dividing the image into the important area and non-important area according to the pre-determined strategy is specifically embodied as below: using a fixed area in the image as the important area and the area other than the fixed area as the non-important area.

In the transmission method according to the embodiments of the present invention, the dividing of the important area and the non-important area in the image can be based on a fixed principle. That is, a fixed area in the image, e.g., the circular area, with the center of the image as the center of the circle and with a radius of x, servers as the important area, and the area other than the important area serves the non-important area. As an alternation, a square area, with the center of the image as the center thereof and with a side length of y, is the important area, and the area other than the important area is the non-important area.

In the transmission method, the step for dividing the image into the important area and non-important area according to the pre-determined strategy is specifically embodied as below: determining a pre-determined object into which the important area to be divided in the image; analyzing the image to identify the boundary of the pre-determined object; and dividing the image into the important area and non-important area with the boundary.

In the above transmission method, the step for determining the pre-determined object into which the important area to be divided in the image is specifically embodied as below: determining a face of human in the image as the pre-determined object.

In addition to determination of the fixed area in the image as the important area, a pre-determined object in the image can be dynamically determined as the important area in the image. For example, a specific object in the image can be identified by image analysis, for example, an automobile, architecture and the like can serve as the important area in the image. In such a case, it needs to determine the pre-determined object into which the important area to be divided in the image, e.g., the automobiles, architecture and the like. Then, the boundary of the pre-determined object is identified by image analysis, and the pre-determined object is divided as the important area of the image based on the boundary, the image portion other than the pre-determined object being divided as the non-important area of the image.

As such, in the application modes such as video chatting, video conference and the like, a face of human in an image to be transmitted can be determined as a pre-determined object in the image, and thus the image regarding the face of human is processed as the important area of the image, and the background and the peripheral image other than the face of human are processed as the non-important area of the image. Thus, even if there is a slight distortion in the quality of the image in the non-important area, the influence over the perception of the user is not significant. Meanwhile, since the amount of the data to be transmitted is reduced, the quality of the data transmission over the network can be improved.

As such, when the image to be transmitted is processed by the transmission method according to the embodiments of the present invention, the coding algorithms and the parameters can be dynamically adjusted according to different motion states, and thus the amount of the data resulting from the coding is ensured relatively stable, avoiding the occurrence of the issues involving the lost frame, lost packet during the wireless transmission. Further, for differently handling the case in which the image is in static from that the image is in motion, it can be ensured that the image is clear and smooth in static, and the quality issues such as deformation, mosaic and the like are avoid in motion.

Therefore, it can effectively reduce the amount of the data to be transmitted in wireless transmission by utilizing the transmission method according to the embodiments of the present invention to process the data to be transmitted in several parts, and thus can improve the quality of the data transmission over the transmission network.

According to another aspect of the embodiments of the present invention, an electronic device is provided, which serves as a sending device in a transmission network and transmits data from the electronic device to a receiving device over the transmission network, the electronic device comprising: a detecting module configured to detect whether a pre-determined condition is satisfied; a dividing module configured to divide the data to be transmitted into a first data and a second data when the detecting module detects that the pre-determined condition is satisfied; a converting module configured to convert the first data divided by the dividing module to a third data by a first algorithm and convert the second data divided by the dividing module to a fourth data by a second algorithm so that the sum of the amounts of the third data and the fourth data is less than the sum of the amounts of the first data and the second data, wherein the first algorithm is different from the second algorithm; and a transmitting module, transmitting the third data and the fourth data converted by the converting module to the receiving device.

Figure 2:
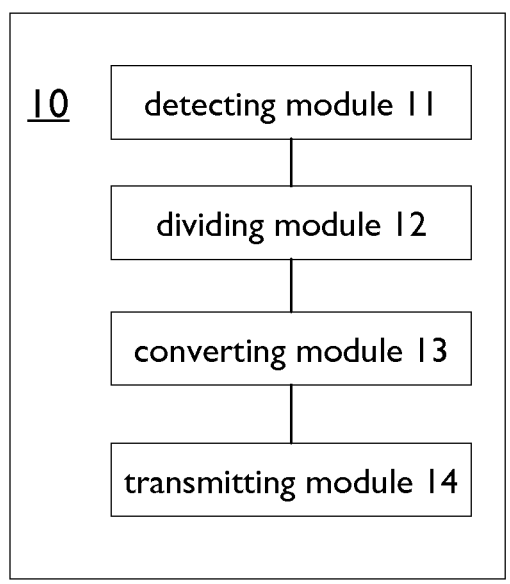
FIG. 2 is a schematic block diagram illustrating an electronic device according to an embodiment of the present invention.

FIG. 2 is an illustrative block diagram of the electronic device according to the embodiments of the present invention. As shown in FIG. 2, the electronic device 10 serves as a sending device in a transmission network. In the transmission network, the electronic device 10 transmits data to a receiving device (not shown), and the electronic device 10 comprises: a detecting module 11 configured to detect whether a pre-determined condition is satisfied; a dividing module 12 configured to divide the data to be transmitted into a first data and a second data when the detecting module 11 detects that the pre-determined condition is satisfied; a converting module 13 configured to convert the first data divided by the dividing module 12 to a third data by a first algorithm and convert the second data divided by the dividing module 12 to a fourth data by a second algorithm so that the sum of the amounts of the third data and the fourth data is less than the sum of the amounts of the first data and the second data, wherein the first algorithm is different from the second algorithm; and a transmitting module 14, transmitting the third data and the fourth data converted by the converting module 13 to the receiving device.

In the above electronic device, in particular, the detecting module is used for detecting whether the network transmission flow of the transmission network is greater than a first threshold.

In the above electronic device, in particular, the detecting module is used for detecting whether the network transmission quality of the transmission network is less than a second threshold.

In the above electronic device, the detecting module comprises a sensor, and in particular the detecting module is used for detecting whether the sending device transmits the data to be transmitted in an interframe compression manner; and in the case of detecting that the sending device transmits the data to be transmitted in an interframe compression manner, detecting by the sensor whether a motion parameter of the sending device is greater than a third threshold.

In the above electronic device, the detecting module comprises a sensor, and in particular the detecting module is used for detecting by the sensor whether a motion parameter of the sending device is greater than a third threshold when the sending device transmits the data to be transmitted in an interframe compression manner.

In the above electronic device, the motion parameter is at least one of the parameters of the sending device as follows: motion speed, motion amplitude, and motion angle.

In the above electronic device, particularly, the converting module is used for compressing the first data into the third data by a first compression algorithm and compressing the second data into the fourth data by a second compression algorithm; wherein, the second compression algorithm has a higher data compression ratio than the first compression algorithm does.

In the above electronic device, particularly, the converting module is used for converting the first data into the third data to be transmitted at a first frame rate and converting the second data into the fourth data to be transmitted at a second frame rate; wherein, the first frame rate is greater than the second frame rate.

In the above electronic device, the data transmitted from the sending device to the receiving device over the transmission network are images.

In the above electronic device, particularly, the dividing module is used for dividing the image into an important area and a non-important area according to a pre-determined strategy, wherein, the image in the important area serves as the first data and the image in the non-important area serves as the second data; and the converting module is particularly used for compressing the important area of the image by a first compression algorithm and compressing the non-important area of the image by a second compression algorithm, wherein the second compression algorithm has a higher data compression ratio than the first compression algorithm does.

In the above electronic device, particularly, the dividing module is used for dividing the image into an important area and a non-important area according to a pre-determined strategy, wherein, the image in the important area serves as the first data and the image in the non-important area serves as the second data; and the transmitting module is particularly used for transmitting the important area of the image at a first frame rate and transmitting the non-important area of the image at a second frame rate, wherein the first frame rate is greater than the second frame rate.

In the above electronic device, an image collection unit is further included therein, wherein an image collected by the image collection unit serves as the data to be transmitted.

In the above electronic device, the image collected in real-time by the image collection unit serves as the data to be transmitted.

In the above electronic device, dividing the image into the important area and non-important area according to the pre-determined strategy by the dividing module is specifically embodied as below: using a fixed area in the image as the important area and the area other than the fixed area as the non-important area.

In the above electronic device, dividing the image into the important area and non-important area according to the pre-determined strategy by the dividing module is specifically embodied as below: determining a pre-determined object into which the important area to be divided in the image; analyzing the image to identify the boundary of the pre-determined object; and dividing the image into the important area and non-important area with the boundary.

In the above electronic device, determining a pre-determined object into which the important area to be divided in the image by the dividing module is specifically embodied as below: determining a face of human in the image as the pre-determined object.

Herein, the other details of the electronic device according to the embodiments of the present invention are similar to those of the transmission method according to the embodiments of the present invention, and the previous statements with regard to the aspects of the transmission method according to the embodiments of the present invention are equivalently applied to the electronic device according to the embodiments of the present invention. For the sake of simplicity, the details thereof are omitted.

By means of the transmission method and the electronic device according to the embodiments of the present invention, the data to be transmitted can be divided into a plurality of parts, and individual parts can be processed separately to reduce the amount of the data to be transmitted, thus improving the quality of the data transmission.

Detailed descriptions have been given on the present invention with reference to the specific embodiments. Nevertheless, it is obvious that those skilled can make a modification and alternation on the embodiments without departing from the spirit of the present invention. In other words, the present invention is disclosed in an illustrative manner rather than being interpreted in any limited manner. It should consider the attached claims when judging the intention of the present invention.

The invention claimed is:

1. A transmission method, applied to a sending device in a transmission network, and used for transmitting data to a receiving device from the sending device over the transmission network, wherein the transmission method comprises the steps of:
    detecting whether a predetermined condition is satisfied;
    dividing the data to be transmitted into a first data and a second data when determining that the predetermined condition has been satisfied;
    converting the first data to a third data with a first algorithm and the second data to a fourth data with a second algorithm, so that the sum of the amounts of the third data and the fourth data is less than the sum of the amounts of the first data and the second data, wherein the first algorithm is different from the second algorithm; and
    transmitting the third data and the fourth data to the receiving device,
    wherein the step for detecting whether the pre-determined condition is satisfied comprises detecting whether the sending device transmits the data to be transmitted in an interframe compression manner; and, in the case of detecting that the sending device transmits the data to be sent in an interframe compression manner, detecting by a sensor whether a motion parameter of the sending device is greater than a third threshold.

2. The transmission method as recited in claim 1, wherein the step for detecting whether the pre-determined condition is satisfied is specifically as below:
    detecting whether the network transmission flow over the transmission network is greater than a first threshold, or
    detecting whether the network transmission quality over the transmission network is less than a second threshold.

3. The transmission method as recited in claim 1,
the motion parameter is at least one of the parameters of the sending device as follows: motion speed, motion amplitude, and motion angle.

4. The transmission method as recited in claim 1, wherein the step for detecting whether the pre-determined condition is satisfied is specifically as below:
when the sending device transmits the data to be sent in an interframe compression manner, detecting by a sensor whether a motion parameter of the sending device is greater than a third threshold,
the motion parameter is at least one of the parameters of the sending device as follows: motion speed, motion amplitude, and motion angle.

5. The transmission method as recited in claim 1, wherein the step of converting the first data into the third data by the first algorithm and converting the second data into the fourth data by the second algorithm is specifically as below:
compressing the first data into the third data by a first compression algorithm, and
compressing the second data into the fourth data by a second compression algorithm,
wherein, the second compression algorithm has a higher data compression ratio than the first compression algorithm does; or
converting the first data into the third data to be transmitted at a first frame rate, and
converting the second data into the fourth data to be transmitted at a second frame rate,
wherein, the first frame rate is greater than the second frame rate.

6. The transmission method as recited in claim 1, wherein the data transmitted from the sending device to the receiving device over the transmission network are images;
the step for dividing the data to be transmitted into the first data and the second data is specifically as below:
dividing the image into an important area and a non-important area according to a pre-determined strategy,
wherein, the image in the important area serves as the first data and the image in the non-important area serves as the second data; and
the step for converting the first data into the third data by the first algorithm and converting the second data into the fourth data by the second algorithm is specifically as below:
compressing the important area of the image by a first compression algorithm, and
compressing the non-important area of the image by a second compression algorithm,
wherein the second compression algorithm has a higher data compression ratio than the first compression algorithm does.

7. The transmission method as recited in claim 6, wherein the data transmitted from the sending device to the receiving device over the transmission network are images;
the step for dividing the data to be transmitted into the first data and the second data is specifically as below:
dividing the image into an important area and a non-important area according to a pre-determined strategy,
wherein, the image in the important area serves as the first data and the image in the non-important area serves as the second data; and
the step for converting the first data into the third data by the first algorithm and converting the second data into the fourth data by the second algorithm is specifically as below:
transmitting the important area of the image at a first frame rate, and
transmitting the non-important area of the image at a second frame rate,
wherein the first frame rate is greater than the second frame rate.

8. The transmission method as recited in claim 6, wherein the sending device includes an image collection unit, wherein prior to the step for detecting whether the pre-determined condition is satisfied, the method further comprises:
collecting an image in real-time by the image collection unit as the data to be transmitted.

9. The transmission method as recited in claim 6, wherein the step for dividing the image into the important area and non-important area according to the pre-determined strategy is specifically as below:
using a fixed area in the image as the important area, and using the area other than the fixed area as the non-important area; or
determining a pre-determined object into which the important area to be divided in the image,
analyzing the image to identify a boundary of the pre-determined object, and
dividing the image into the important area and non-important area with the boundary.

10. The transmission method as recited in claim 9, wherein the step for determining the pre-determined object into which the important area to be divided in the image is specifically as below:
determining a face of a human in the image as the pre-determined object.

11. An electronic device, which is applied as a sending device in a transmission network and transmits data from the electronic device to a receiving device over the transmission network, wherein the electronic device comprises:
a processor;
a memory with instructions executable by the processor;
instructions which when executed by the processor perform the steps of:
detecting whether a pre-determined condition is satisfied;
dividing the data to be transmitted into a first data and a second data when the detecting module detects that the pre-determined condition is satisfied;
converting the first data divided by the dividing module to a third data by a first algorithm and convert the second data divided by the dividing module to a fourth data by a second algorithm so that the sum of the amounts of the third data and the fourth data is less than the sum of the amounts of the first data and the second data, wherein the first algorithm is different from the second algorithm; and
transmitting the third data and the fourth data converted by the converting module to the receiving device,
wherein the electronic device comprises a sensor configured to detect whether the sending device transmits the data to be transmitted in an interframe compression manner; and in the case of detecting that the sending device transmits the data to be transmitted in an interframe compression manner, detecting by the sensor whether a motion parameter of the sending device is greater than a third threshold.

12. The electronic device as recited in claim 11, wherein the detecting includes detecting whether the network transmission flow of the transmission network is greater than a first threshold, or detecting whether the network transmission quality of the transmission network is less than a second threshold.

13. The electronic device as recited in claim 11, the motion parameter is at least one of the parameters of the sending device as follows: motion speed, motion amplitude, and motion angle.

14. The electronic device as recited in claim 11, wherein the converting step includes compressing the first data into the third data by a first compression algorithm and compressing the second data into the fourth data by a second compression algorithm, wherein, the second compression algorithm has a higher data compression ratio than the first compression algorithm does; or the converting step includes converting the first data into the third data to be transmitted at a first frame rate and converting the second data into the fourth data to be transmitted at a second frame rate, wherein, the first frame rate is greater than the second frame rate.

15. The electronic device as recited in claim 11, wherein
the data transmitted from the sending device to the receiving device over the transmission network are images;
the dividing step divides the image into an important area and a non-important area according to a pre-determined strategy, wherein, the image in the important area serves as the first data and the image in the non-important area serves as the second data; and
the converting step compresses the important area of the image by a first compression algorithm and compressing the non-important area of the image by a second compression algorithm,
wherein the second compression algorithm has a higher data compression ratio than the first compression algorithm does.

16. The electronic device as recited in claim 15, wherein
the data transmitted from the sending device to the receiving device over the transmission network are images;
the dividing step divides the image into an important area and a non-important area according to a pre-determined strategy,
wherein, the image in the important area serves as the first data and the image in the non-important area serves as the second data; and
the transmitting step transmits the important area of the image at a first frame rate and transmits the non-important area of the image at a second frame rate,
wherein the first frame rate is greater than the second frame rate.

17. The electronic device as recited in claim 15,
wherein the electronic device further comprises an image collection unit, and an image collected in real-time by the image collection unit serves as the data to be transmitted.

18. The electronic device as recited in claim 17,
wherein dividing the image into the important area and non-important area according to the pre-determined strategy comprises:
using a fixed area in the image as the important area and the area other than the fixed area as the non-important area; or
determining a pre-determined object into which the important area to be divided in the image,
analyzing the image to identify the boundary of the pre-determined object, and
dividing the image into the important area and non-important area with the boundary.

19. The electronic device as recited in claim 18, wherein,
determining a pre-determined object into which the important area to be divided in the image comprises:
determining a face of a human in the image as the pre-determined object.

* * * * *